(12) United States Patent
Kim

(10) Patent No.: US 11,321,482 B2
(45) Date of Patent: May 3, 2022

(54) METHOD AND APPARATUS FOR PROTECTING CONFIDENTIAL INFORMATION IN ELECTRIC VEHICLE POWER TRANSFER SYSTEM

(71) Applicants: HYUNDAI MOTOR COMPANY, Seoul (KR); KIA MOTORS CORPORATION, Seoul (KR)

(72) Inventor: Do Hoon Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 186 days.

(21) Appl. No.: 16/703,591

(22) Filed: Dec. 4, 2019

(65) Prior Publication Data

US 2020/0184101 A1    Jun. 11, 2020

(30) Foreign Application Priority Data

Dec. 5, 2018    (KR) .................. 10-2018-0155099

(51) Int. Cl.
| | |
|---|---|
| *H04L 29/06* | (2006.01) |
| *G06F 21/62* | (2013.01) |
| *G06F 21/57* | (2013.01) |
| *G06F 21/44* | (2013.01) |
| *H04W 12/121* | (2021.01) |

(52) U.S. Cl.
CPC .......... *G06F 21/6245* (2013.01); *G06F 21/44* (2013.01); *G06F 21/57* (2013.01); *H04W 12/121* (2021.01); *G06F 2221/034* (2013.01)

(58) Field of Classification Search
CPC ....... G06F 21/6245; G06F 21/44; G06F 21/57
See application file for complete search history.

(56) References Cited

U.S. PATENT DOCUMENTS

| | | | | |
|---|---|---|---|---|
| 4,711,368 | A  * | 12/1987 | Simons ................ | B65D 55/028 116/100 |
| 8,812,860 | B1 * | 8/2014 | Bray ...................... | G06F 21/34 713/182 |
| 2011/0185196 | A1 * | 7/2011 | Asano .................... | B60L 53/00 713/300 |
| 2013/0219452 | A1 * | 8/2013 | Liu ......................... | G06F 21/00 726/1 |
| 2014/0157004 | A1 * | 6/2014 | Park ...................... | H04L 9/0897 713/189 |
| 2018/0001776 | A1 * | 1/2018 | Kim ....................... | B60L 53/66 |

* cited by examiner

*Primary Examiner* — Jason K Gee
(74) *Attorney, Agent, or Firm* — Mintz Levin Cohn Ferris Glovsky and Popeo, P.C.; Peter F. Corless

(57) ABSTRACT

A method for protecting confidential information in an EV power transfer system includes determining whether there is an abnormality in a storage device in which confidential information for transferring electric power from a charging station to the EV is stored. The method further includes transmitting a message warning a risk of leakage of the confidential information when it is determined that there is the abnormality in the storage device. An apparatus for protecting confidential information in an EV power transfer system includes a processor and a memory storing instructions that cause the processor to perform the method.

16 Claims, 7 Drawing Sheets

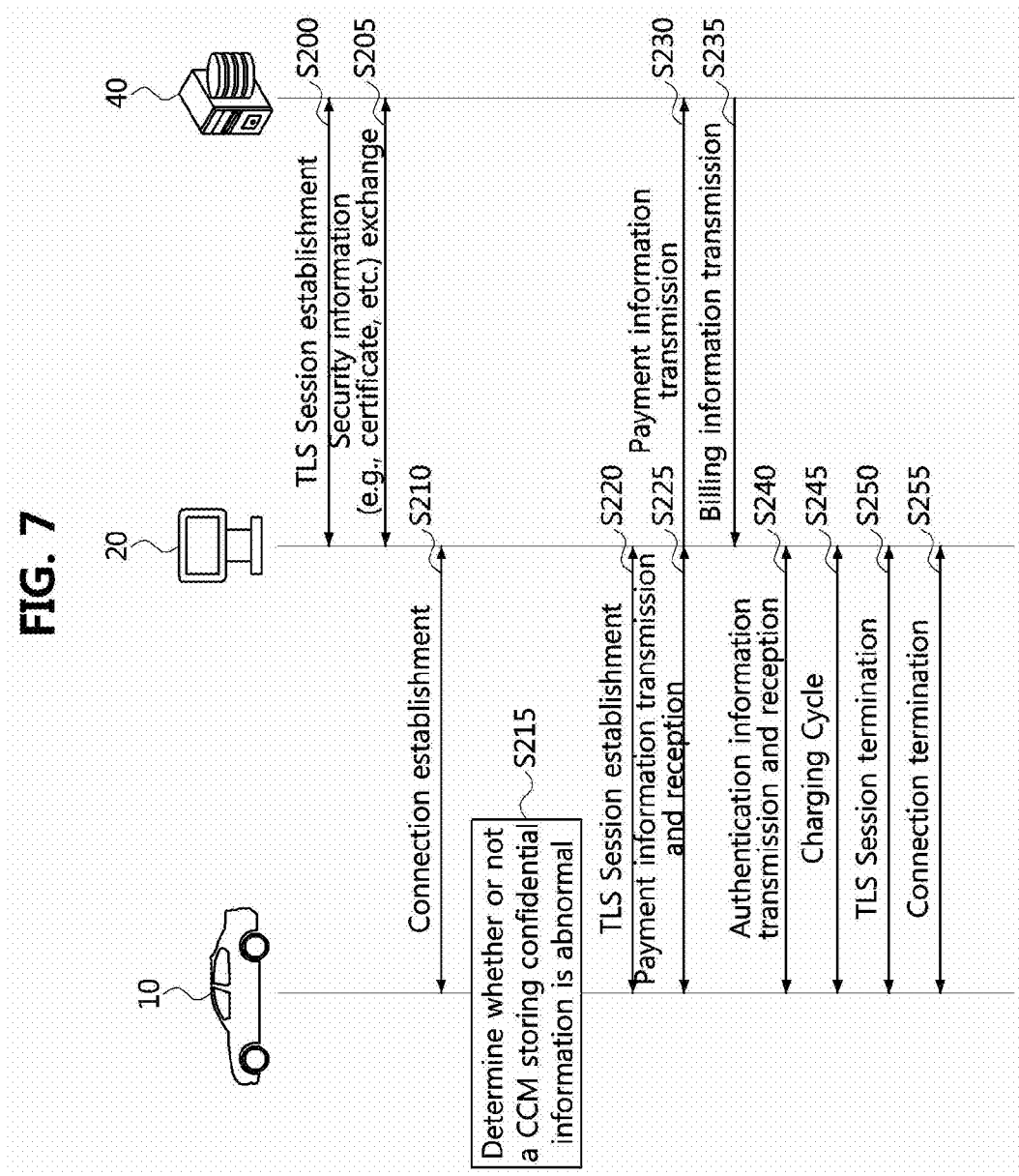

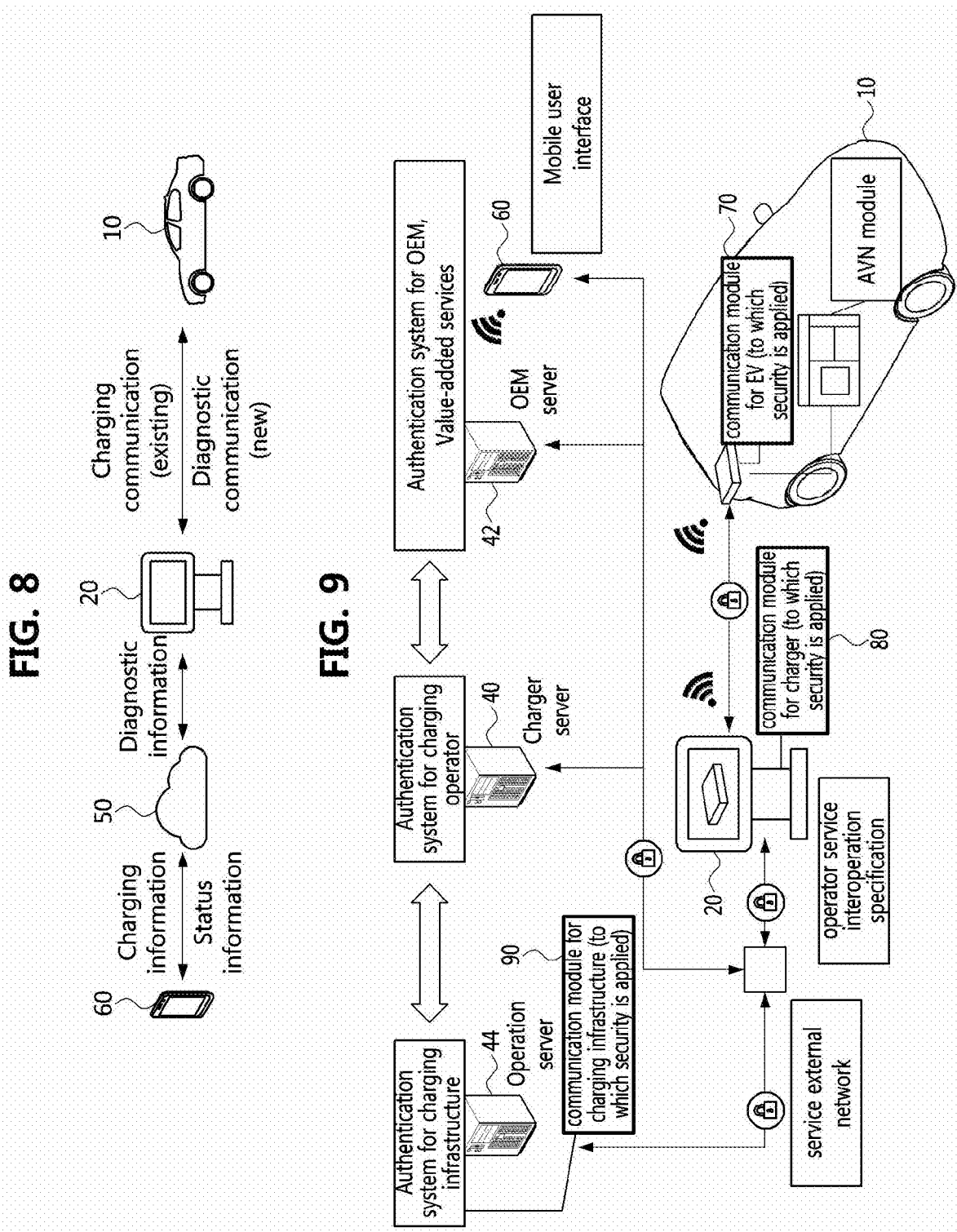

METHOD AND APPARATUS FOR PROTECTING CONFIDENTIAL INFORMATION IN ELECTRIC VEHICLE POWER TRANSFER SYSTEM

CROSS-REFERENCES TO RELATED APPLICATIONS

The present application claims the benefit of priority to Korean Patent Application No. 10-2018-0155099 filed on Dec. 5, 2018 in the Korean Intellectual Property Office (KIPO), the entire contents of which are incorporated herein by reference.

TECHNICAL FIELD

The present disclosure relates to a method and an apparatus for protecting confidential information in an electric vehicle power transfer system.

BACKGROUND

An electric vehicle (EV) power transfer system may be defined as a system for charging a high-voltage battery mounted in an EV using power of an energy storage device or a power grid of a commercial power source. The EV power transfer system may have various forms depending on the type of EV. For example, the EV power transfer system may be classified as a conductive-type using a charging cable or a non-contact wireless power transfer (WPT)-type (also referred to as an "inductive-type").

When transferring power to an EV wirelessly, a reception coil in a vehicle assembly (VA) mounted in the EV forms an inductive resonant coupling with a transmission coil in a group assembly (GA) located in a charging station or a charging spot. Electric power is then transferred from the GA to the VA to charge the high-voltage battery of the EV through the inductive resonant coupling.

On the other hand, in the EV power transfer system including both the above-described non-contact WPT-type and conductive-type, a method of billing a charging amount includes a method in which a consumer makes a payment directly to an external charging station using a credit card or the like, and a method in which the payment is automatically made using payment information stored in the EV.

SUMMARY

The present disclosure is directed to techniques for inhibiting or preventing external intrusion of confidential information by detecting in advance whether or not a storage device storing confidential information for power transfer is intruded.

When making payment directly to the external charging station, the payment information of the consumer is temporarily used in the payment process. For automatically making payment using payment information stored in the EV, the payment information stored in the EV may be leaked if security of a storage where the payment information is stored is weak, and it may be easily taken over by an intruder.

For example, after the intruder removes an enclosure of a charging control module (CCM) storing various confidential information including the payment information, the intruder may copy the confidential information stored in the storage (or memory) of the CCM or take the CCM and mount it on a vehicle of the intruder as it is. Accordingly, there is a need for a method of protecting a security vulnerability caused by the intrusion of the confidential information by an intruder in the power transfer step.

Embodiments of the present disclosure provide a method for protecting confidential information in an EV power transfer system. Also, embodiments of the present disclosure provide an apparatus for protecting confidential information in an EV power transfer system. Also, embodiments of the present disclosure provide an EV for protecting a storage device storing confidential information from external intrusion in an EV power transfer system.

According to embodiments of the present disclosure, a confidential information protection method performed in an EV in an EV power transfer system may comprise determining whether there is an abnormality in a storage device in which confidential information for transferring electric power from a charging station to the EV is stored; and transmitting a message warning a risk of leakage of the confidential information when it is determined that there is the abnormality in the storage device, wherein the determining whether there is an abnormality in the storage device includes sensing a physical property change of the storage device or verifying unique information of the storage device.

The confidential information may include at least one of information on the EV, user information, authentication information, payment information, an encryption key and a certificate for mutual authentication and payment between the EV and the charging station.

In the determining whether there is an abnormality in the storage device, a change in a physical property of an enclosure of the storage device due to removal or damage of the enclosure of the storage device may be sensed.

The physical property may include an insulation resistance of an enclosure of the storage device.

The determining whether there is an abnormality in the storage device may further include monitoring an insulation resistance of the enclosure of the storage device; and determining whether a measured insulation resistance changes as a result of the monitoring to a predetermined threshold value or more.

The determining whether there is an abnormality in the storage device may further include verifying real time clock (RTC) information of the storage device.

The verifying RTC information may further include storing the RTC information of the storage device before turning off the EV; obtaining the RTC information of the storage device mounted on the EV after starting the EV; and comparing the obtained RTC information with the RTC information stored before turning off the EV.

The storage device may be an electric vehicle communication controller (EVCC) embedded in the EV.

Furthermore, according to embodiments of the present disclosure, an apparatus for protecting confidential information, which is mounted on EV in an EV power transfer system, may comprise at least one processor and a memory storing instructions that direct the at least one processor to perform at least one step. Also, the at least one step may include determining whether there is an abnormality in a storage device in which confidential information for transferring electric power from a charging station to the EV is stored; and transmitting a message warning a risk of leakage of the confidential information when it is determined that there is the abnormality in the storage device, wherein the determining whether there is an abnormality in the storage device includes sensing a physical property change of the storage device or verifying unique information of the storage device.

The confidential information may include at least one of information on the EV, user information, authentication information, payment information, an encryption key and a certificate for mutual authentication and payment between the EV and the charging station.

In the determining whether there is an abnormality in the storage device, a change in a physical property of an enclosure of the storage device due to removal or damage of the enclosure of the storage device may be sensed.

The determining whether there is an abnormality of the storage device may include determining whether the storage device is abnormal through an insulation resistance of an enclosure of the storage device.

The determining whether there is an abnormality in the storage device may further include monitoring an insulation resistance of the enclosure of the storage device; and determining whether a measured insulation resistance changes as a result of the monitoring to a predetermined threshold value or more.

The determining whether there is an abnormality in the storage device may further include verifying real time clock (RTC) information of the storage device.

The verifying RTC information may further include storing the RTC information of the storage device before turning off the EV; obtaining the RTC information of the storage device mounted on the EV after starting the EV; and comparing the obtained RTC information with the RTC information stored before turning off the EV.

The storage device may be an electric vehicle communication controller (EVCC) embedded in the EV.

Furthermore, according to embodiments of the present disclosure, an EV for protecting a storage device in which confidential information is stored from external intrusion in an EV power transfer system may comprise at least one processor; a battery receiving power from a charging station and storing the power; an electric vehicle communication controller (EVCC) transmitting and receiving data for power transfer by wirelessly communication with the charging station; the storage device storing the confidential information for the power transfer; and a memory storing instructions that direct the at least one processor to perform at least one step. Also, the at least one step may include determining whether there is an abnormality in a storage device in which confidential information for transferring electric power from a charging station to the EV is stored; and transmitting a message warning a risk of leakage of the confidential information when it is determined that there is the abnormality in the storage device, wherein the determining whether there is an abnormality in the storage device includes sensing a physical property change of the storage device or verifying unique information of the storage device.

The confidential information may include at least one of information on the EV, user information, authentication information, payment information, an encryption key and a certificate for mutual authentication and payment between the EV and the charging station.

The storage device may be implemented as an integrated module with the EVCC.

The determining whether there is an abnormality of the storage device may include determining whether the storage device is abnormal through an insulation resistance of an enclosure of the storage device.

In the EV power transfer system according to the present disclosure, when the method and apparatus for protecting confidential information are used, the external or physical intrusion of confidential information stored in the device can be detected in advance. Accordingly, the confidential information can be protected more safely by combining the security method for detecting physical intrusion according to the present disclosure and other data security method for solving a security vulnerability that may occur in a communication process.

BRIEF DESCRIPTION OF DRAWINGS

Embodiments of the present disclosure will become more apparent by describing in detail embodiments of the present disclosure with reference to the accompanying drawings, in which:

FIG. 7 is a sequence diagram for explaining an EV power transfer method in which security of confidential information is enhanced through the method according to FIGS. 5 to 6 in an EV power transfer system according to an embodiment of the present disclosure;

FIG. 8 is a diagram illustrating a first example to which a confidential information protection method is applied in an EV power transfer system according to an embodiment of the present disclosure;

FIG. 9 is a diagram illustrating a second example to which a confidential information protection method is applied in an EV power transfer system according to an embodiment of the present disclosure.

Figure 1:
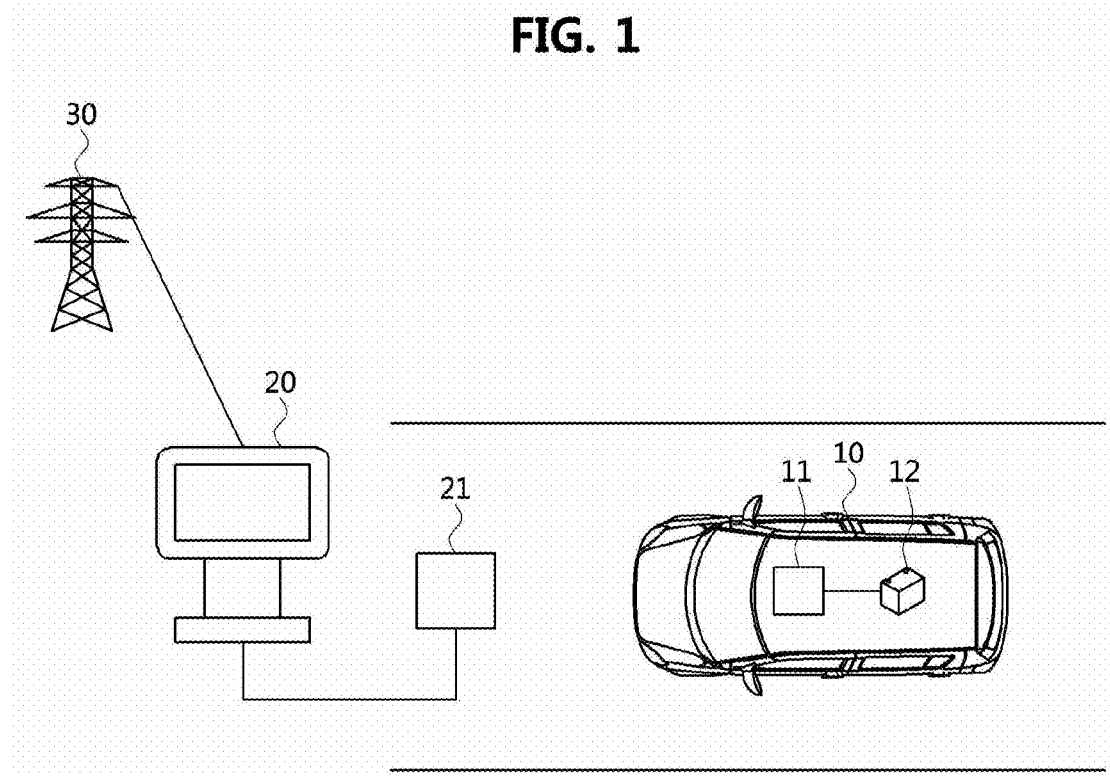
FIG. 1 is a conceptual diagram illustrating a concept of a wireless power transfer (WPT) to which embodiments of the present disclosure are applied.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION OF EMBODIMENTS

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. For example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

According to embodiments of the present disclosure, an EV charging system may be defined as a system for charging a high-voltage battery mounted in an EV using power of an energy storage device or a power grid of a commercial power source. The EV charging system may have various forms depending on the type of EV. For example, the EV charging system may be classified as a conductive-type using a charging cable or a non-contact wireless power transfer (WPT)-type (also referred to as an "inductive-type"). The power source may include a residential or public electrical service or a generator utilizing vehicle-mounted fuel, and the like.

Additional terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets or roads.

The EV may include an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An EV that recharges the on-vehicle primary battery by connecting to the power grid.

"Plug-in vehicle (PV)": An electric vehicle rechargeable through wireless charging from an electric vehicle supply equipment (EVSE) without using a physical plug or a physical socket.

"Heavy duty vehicle (H. D. Vehicle)": Any four-or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": The system for wireless power transfer and control between the GA and VA including alignment and communications. This system transfers energy from the electric supply network to the electric vehicle electromagnetically through a two-part loosely coupled transformer.

"Wireless power transfer (WPT)": The transfer of electrical power from the AC supply network to the electric vehicle by contactless means.

"Utility": A set of systems which supply electrical energy and may include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

"Smart charging": A system in which EVSE and/or PEV communicate with power grid in order to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which components of a system interwork with corresponding components of the system in order to perform operations aimed by the system. Also, information interoperability may mean capability that two or more networks, systems, devices, applications, or components can efficiently share and easily use information without causing inconvenience to users.

"Inductive charging system": A system transferring energy from a power source to an EV through a two-part gapped core transformer in which the two halves of the transformer, primary and secondary coils, are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side including the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

"Vehicle assembly (VA)": An assembly on the vehicle including the VA Coil, rectifier/power conversion unit and VA controller as well as the wiring to the vehicle batteries and between each unit, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device (PD)": An apparatus which provides the contactless coupling to the secondary device. The primary device may be an apparatus external to an EV When the EV is receiving power, the primary device may act as the source of the power to be transferred. The primary device may include the housing and all covers.

"Secondary device (SD)": An apparatus mounted on the EV which provides the contactless coupling to the primary device. The secondary device may be installed in the EV When the EV is receiving power, the secondary device may transfer the power from the primary to the EV The secondary device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA coil magnetic surface distance": the distance between the plane of the nearest magnetic or conducting component surface to the lower exterior surface of the VA coil when mounted. This distance includes any protective coverings and additional items that may be packaged in the VA coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized in case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. Pairing may include the process by which a VA controller and a GA controller of a charging spot are correlated. The correlation/association process may include the process of establishment of a relationship between two peer communication entities.

"Command and control communication": The communication between the EV supply equipment and the EV exchanges information necessary to start, control and terminate the process of WPT.

"High-level communication (HLC)": HLC is a special kind of digital communication. HLC is necessary for additional services which are not covered by command & control communication. The data link of the HLC may use a power line communication (PLC), but it is not limited.

"Low-power excitation (LPE)": LPE means a technique of activating the primary device for the fine positioning and pairing so that the EV can detect the primary device, and vice versa.

"Service set identifier (SSID)": SSID is a unique identifier having 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is the name of the network to which one desires to connect. It is similar to SSID but can be a more extended concept.

"Basic service set identifier (BSSID)": BSSID having 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller configured to manage the at least one GA. The GA may comprise at least one wireless communication device. The charging station may mean a place having at least one GA, which is installed in home, office, public place, road, parking area, etc.

According to embodiments of the present disclosure, "rapid charging" may refer to a method of directly converting AC power of a power system to DC power, and supplying the converted DC power to a battery mounted on an EV Here, a voltage of the DC power may be DC 500 volts (V) or less.

According to embodiments of the present disclosure, "slow charging" may refer to a method of charging a battery mounted on an EV using AC power supplied to a general home or workplace. An outlet in each home or workplace, or an outlet disposed in a charging stand may provide the AC power, and a voltage of the AC power may be AC 220V or less. Here, the EV may further include an on-board charger (OBC) which is a device configured for boosting the AC power for the slow charging, converting the AC power to DC power, and supplying the converted DC power to the battery.

According to embodiments of the present disclosure, a frequency tuning may be used for performance optimization. Here, the frequency tuning may be performed by a supply device and may not be performed by an EV device. Also, it may be required for all the primary devices to provide the frequency tuning over a full range. In addition, an electric vehicle power controller (EVPC) may operate in a frequency range between 81.38 kHz and 90.00 kHz. A nominal frequency (hereinafter, referred to as a target frequency, a design frequency, or a resonance frequency) for the magnetic field wireless power transfer (MF-WPT) may be 85 kHz. The power supply circuits may provide the frequency tuning.

Hereinafter, embodiments of the present disclosure will be explained in detail by referring to accompanying figures.

FIG. 1 is a conceptual diagram illustrating a concept of a wireless power transfer (WPT) to which embodiments of the present disclosure are applied.

As shown in FIG. 1, a WPT may be performed by at least one component of an electric vehicle (EV) 10 and a charging station 20, and may be used for wirelessly transferring power to the EV 10.

Here, the EV 10 may be usually defined as a vehicle supplying an electric power stored in a rechargeable energy storage including a battery 12 as an energy source of an electric motor which is a power train system of the EV 10.

However, the EV 10 according to embodiments of the present disclosure may include a hybrid electric vehicle (HEV) having an electric motor and an internal combustion engine together, and may include not only an automobile but also a motorcycle, a cart, a scooter, and an electric bicycle.

Also, the EV 10 may include a power reception pad 11 including a reception coil for charging the battery 12 wirelessly and may include a plug connection for conductively charging the battery 12. Here, the EV 10 configured for conductively charging the battery 12 may be referred to as a plug-in electric vehicle (PEV).

Here, the charging station 20 may be connected to a power grid 30 or a power backbone, and may provide an alternating current (AC) power or a direct current (DC) power to a power transmission pad 21 including a transmission coil through a power link.

Also, the charging station 20 may communicate with an infrastructure management system or an infrastructure server that manages the power grid 30 or a power network through wired/wireless communications, and performs wireless communications with the EV 10. Here, the wireless communications may be Bluetooth, ZigBee, cellular, wireless local area network (WLAN), or the like.

Also, for example, the charging station 20 may be located at various places including a parking area attached to the owner's house of the EV 10, a parking area for charging an EV at a gas station, a parking area at a shopping center or a workplace.

A process of wirelessly charging the battery 12 of the EV 10 may begin with first placing the power reception pad 11 of the EV 10 in an energy field generated by the power transmission pad 21, and making the reception coil and the transmission coil be interacted or coupled with each other. An electromotive force may be induced in the power reception pad 11 as a result of the interaction or coupling, and the battery 12 may be charged by the induced electromotive force.

The charging station 20 and the transmission pad 21 may be referred to as a ground assembly (GA) in whole or in part, where the GA may refer to the previously defined meaning.

All or part of the internal components and the reception pad 11 of the EV 10 may be referred to as a vehicle assembly (VA), in which the VA may refer to the previously defined meaning.

Here, the power transmission pad or the power reception pad may be configured to be non-polarized or polarized.

In a case that a pad is non-polarized, there is one pole in a center of the pad and an opposite pole in an external periphery. Here, a flux may be formed to exit from the center of the pad and return at all to external boundaries of the pad.

In a case that a pad is polarized, it may have a respective pole at either end portion of the pad. Here, a magnetic flux may be formed based on an orientation of the pad.

In the present disclosure, the transmission pad 21 or the reception pad 11 may collectively be referred to as a "wireless charging pad".

Figure 2:
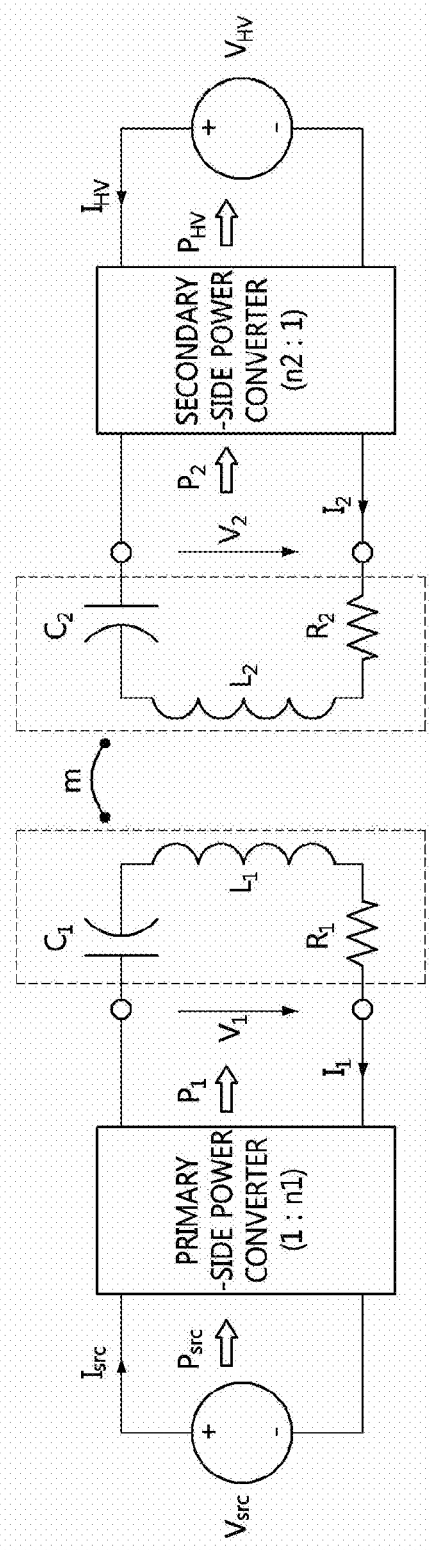
FIG. 2 is a conceptual diagram illustrating a WPT circuit according to embodiments of the present disclosure.

FIG. 2 is a conceptual diagram illustrating a WPT circuit according to embodiments of the present disclosure.

As shown in FIG. 2, a schematic configuration of a circuit in which a WPT is performed in an EV WPT system may be seen.

Here, the left side of FIG. 2 may be interpreted as expressing all or part of a power source $V_{src}$ supplied from the power network, the charging station 20, and the transmission pad 21 in FIG. 1, and the right side of FIG. 2 may be interpreted as expressing all or part of the EV including the reception pad and the battery.

First, the left-side circuit of FIG. 2 may provide an output power $P_{src}$ corresponding to the power source $V_{src}$ supplied from the power network to a primary-side power converter. The primary-side power converter may supply an output power $P_1$ converted from the output power $P_{src}$ through frequency-converting and AC-to-DC/DC-to-AC converting to generate an electromagnetic field at a desired operating frequency in a transmission coil $L_1$.

Specifically, the primary-side power converter may include an AC/DC converter for converting the power $P_{src}$ which is an AC power supplied from the power network into a DC power, and a low frequency (LF) converter for converting the DC power into an AC power having an operating frequency suitable for wireless charging. For example, the operating frequency for wireless charging may be determined to be within 80 to 90 kHz.

The power $P_1$ output from the primary-side power converter may be supplied again to a circuit including the transmission coil $L_1$, a first capacitor $C_1$ and a first resistor $R_1$. Here, a capacitance of the first capacitor $C_1$ may be determined as a value to have an operating frequency suitable for charging together with the transmission coil $L_1$.

Here, the first resistor $R_1$ may represent a power loss occurred by the transmission coil $L_1$ and the first capacitor $C_1$.

Further, the transmission coil $L_1$ may be made to have electromagnetic coupling, which is defined by a coupling coefficient m, with the reception coil $L_2$ so that a power $P_2$ is transmitted, or the power $P_2$ is induced in the reception coil $L_2$. Therefore, the meaning of power transfer in the present disclosure may be used together with the meaning of power induction.

Still further, the power $P_2$ induced in or transferred to the reception coil $L_2$ may be provided to a secondary-side power converter. Here, a capacitance of a second capacitor $C_2$ may be determined as a value to have an operating frequency suitable for wireless charging together with the reception coil $L_2$, and a second resistor $R_2$ may represent a power loss occurred by the reception coil $L_2$ and the second capacitor $C_2$.

The secondary-side power converter may include an LF-to-DC converter that converts the supplied power $P_2$ of a specific operating frequency to a DC power having a voltage level suitable for the battery $V_{HV}$ of the EV.

The electric power $P_{HV}$ converted from the power $P_2$ supplied to the secondary-side power converter may be output, and the power $P_{HV}$ may be used for charging the battery $V_{HV}$ disposed in the EV.

The right side circuit of FIG. 2 may further include a switch for selectively connecting or disconnecting the reception coil $L_2$ with the battery $V_{HV}$. Here, resonance frequencies of the transmission coil $L_1$ and the reception coil $L_2$ may be similar or identical to each other, and the reception coil $L_2$ may be positioned near the electromagnetic field generated by the transmission coil $L_1$.

The circuit of FIG. 2 should be understood as an illustrative circuit for WPT in the EV WPT system used for embodiments of the present disclosure, and is not limited to the circuit illustrated in FIG. 2.

On the other hand, since the power loss may increase as the transmission coil $L_1$ and the reception coil $L_2$ are located at a long distance, it may be an important factor to properly set the relative positions of the transmission coil $L_1$ and the reception coil $L_2$.

The transmission coil $L_1$ may be included in the transmission pad 21 in FIG. 1, and the reception coil $L_2$ may be included in the reception pad 11 in FIG. 1. Also, the transmission coil may be referred to also as a GA coil, and the reception coil may be referred to also as a VA coil. Therefore, positioning between the transmission pad and the reception pad or positioning between the EV and the transmission pad will be described below with reference to the drawings.

Figure 3:
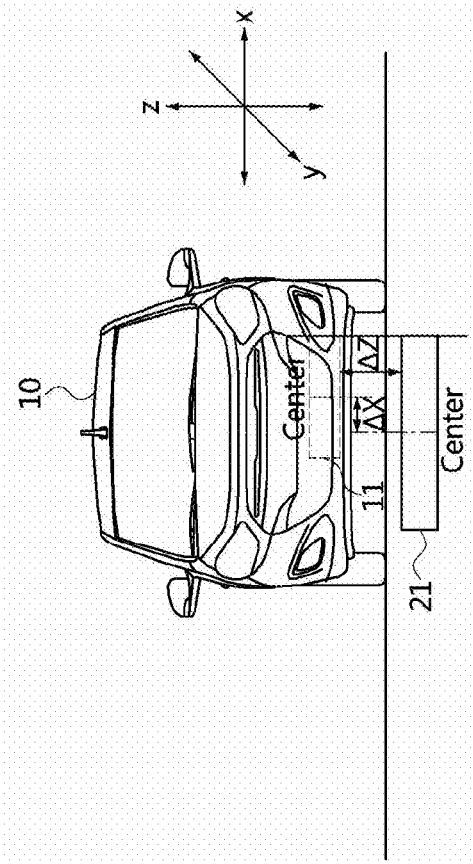
FIG. 3 is a conceptual diagram for explaining a concept of alignment in an EV WPT according to embodiments of the present disclosure.

FIG. 3 is a conceptual diagram for explaining a concept of alignment in an EV WPT according to embodiments of the present disclosure.

As shown in FIG. 3, a method of aligning the power transmission pad 21 and the power reception pad 11 in the EV in FIG. 1 will be described. Here, positional alignment may correspond to the alignment, which is the above-mentioned term, and thus may be defined as positional alignment between the GA and the VA, but is not limited to the alignment of the transmission pad and the reception pad.

Although the transmission pad 21 is illustrated as positioned below a ground surface as shown in FIG. 3, the transmission pad 21 may also be positioned on the ground surface, or positioned such that a top portion surface of the transmission pad 21 is exposed below the ground surface.

The reception pad 11 of the EV may be defined by different categories based on its heights (defined in the z-direction) measured from the ground surface. For example, a class 1 for reception pads having a height of 100-150 millimeters (mm) from the ground surface, a class 2 for reception pads having a height of 140-210 mm, and a class 3 for reception pads having a height of 170-250 mm may be defined. Here, the reception pad may support a part of the above-described classes 1 to 3. For example, only the class 1 may be supported depending on the type of the reception pad 11, or the class 1 and 2 may be supported depending on the type of the reception pad 11.

The height of the reception pad measured from the ground surface may correspond to the previously defined term "vehicle magnetic ground clearance."

Further, the position of the power transmission pad 21 in the height direction (i.e., defined in the z-direction) may be determined to be located between the maximum class and the minimum class supported by the power reception pad 11. For example, when the reception pad supports only the class 1 and 2, the position of the power transmission pad 21 may be determined between 100 and 210 mm with respect to the power reception pad 11.

Still further, a gap between the center of the power transmission pad 21 and the center of the power reception pad 11 may be determined to be located within the limits of the horizontal and vertical directions (defined in the x- and y-directions). For example, it may be determined to be located within +75 mm in the horizontal direction (defined in the x-direction), and within +100 mm in the vertical direction (defined in the y-direction).

In embodiments, the relative positions of the power transmission pad 21 and the power reception pad 11 may be varied in accordance with their experimental results, and the numerical values should be understood as examples.

Although the alignment between the pads is described on the assumption that each of the transmission pad 21 and the reception pad 11 includes a coil, more specifically, the alignment between the pads may mean the alignment between the transmission coil (or GA coil) and the reception coil (or VA coil) which are respectively included in the transmission pad 21 and the reception pad 11.

Figure 4:
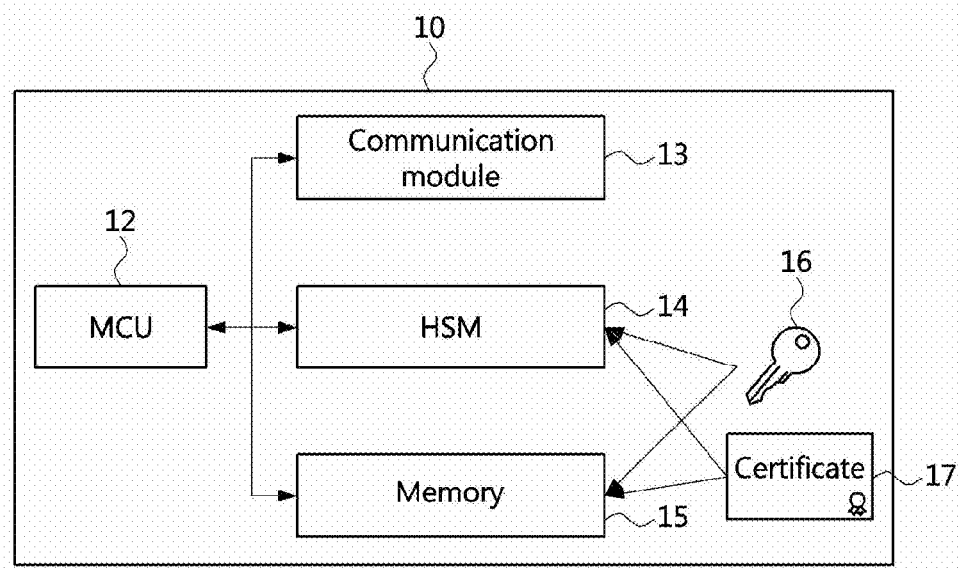
FIG. 4 is a block diagram illustrating a structure of a charging control module (CCM) that is mounted on a vehicle and controls power transfer in an EV power transfer system according to an embodiment of the present disclosure.

FIG. 4 is a block diagram illustrating a structure of a charging control module (CCM) that is mounted on a vehicle and controls power transfer in an EV power transfer system according to an embodiment of the present disclosure.

In the EV electric power transfer system performing conductive charging and/or inductive charging, an apparatus, which is installed in an EV, controls electric power transfer for the EV, and performs payment, user authentication, and the like, may be referred to as a charging controller 10 (e.g., charging control module (CCM)). In some cases, the charging controller 10 may be referred to as an EV communication controller (EVCC). Hereinafter, the charging controller 10 may be referred to simply as the CCM.

As shown in FIG. 4, the CCM 10 may include at least one of a micro circuit unit (MCU) 12, a communication module 13, a hardware security module (HSM) 14, and a memory 15.

The MCU 12 may control the communication module 13 to perform data transmission and reception for the electric power transfer of the EV, user (or vehicle) authentication, payment authentication, and the like, and may perform verification of integrity of an encryption key 16 or a certificate 17, and the like by controlling the HSM 14. In addition, the MCU 12 may temporarily or non-temporarily store data transmitted or received through the communication module 13 or data necessary for data security through the HSM 14 in the memory 15. Here, the certificate 17 may include a root certificate (i.e., V2G root certificate) for authentication in the communication process between the vehicle and a power network.

The communication module 13 may perform wireless communication or power line communication (PLC) with a charging station.

Confidential information such as the encryption key 16 for encrypting the user's personal information and payment information, the certificate 17 for security of data communication in a payment process and the charging process, and the user's personal information and payment information may be stored in the memory 15. In this case, the encryption key 16 and the certificate 17 may be stored independently of the other confidential information in the HSM 14 for further enhanced security.

The HSM 14, which is a device that securely stores the encryption key 16 and/or the certificate 17, may be embedded in the CCM 10 or mounted in the EV independently of the CCM 10. The HSM 14 may also perform an encryption (or decryption) operation (e.g. DES, TDES, RSA, etc.) using the encryption key 16. The encryption key 16 and the certificate 17 may be stored in independent hardware such as the HSM 14 so that a security vulnerability due to vehicle hacking can be primarily protected.

Meanwhile, the various confidential information stored in the CCM 10 can be protected through secure communication in transmission and reception, and integrity verification, encryption, etc. of the confidential information at a receiving side. However, there is a possibility that the confidential information may be leaked by copying the data stored in the memory after an intruder removes a cover (or, enclosure) of the CCM 10. There is also a possibility that an intruder may take out the CCM 10 and use it in the vehicle of the intruder as it is.

Therefore, a security procedure for preventing or avoiding leakage of the confidential information through intrusion, substitution, etc. of the CCM 10 in which the confidential information is stored will be described below.

Figure 5:
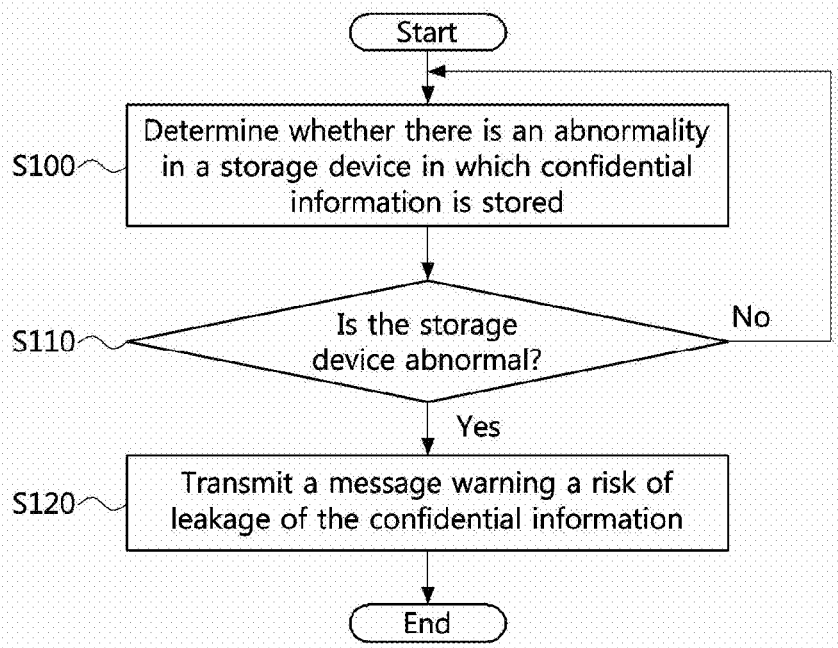
FIG. 5 is a flowchart illustrating a method for protecting confidential information in an EV power transfer system according to an embodiment of the present disclosure.
Figure 6:
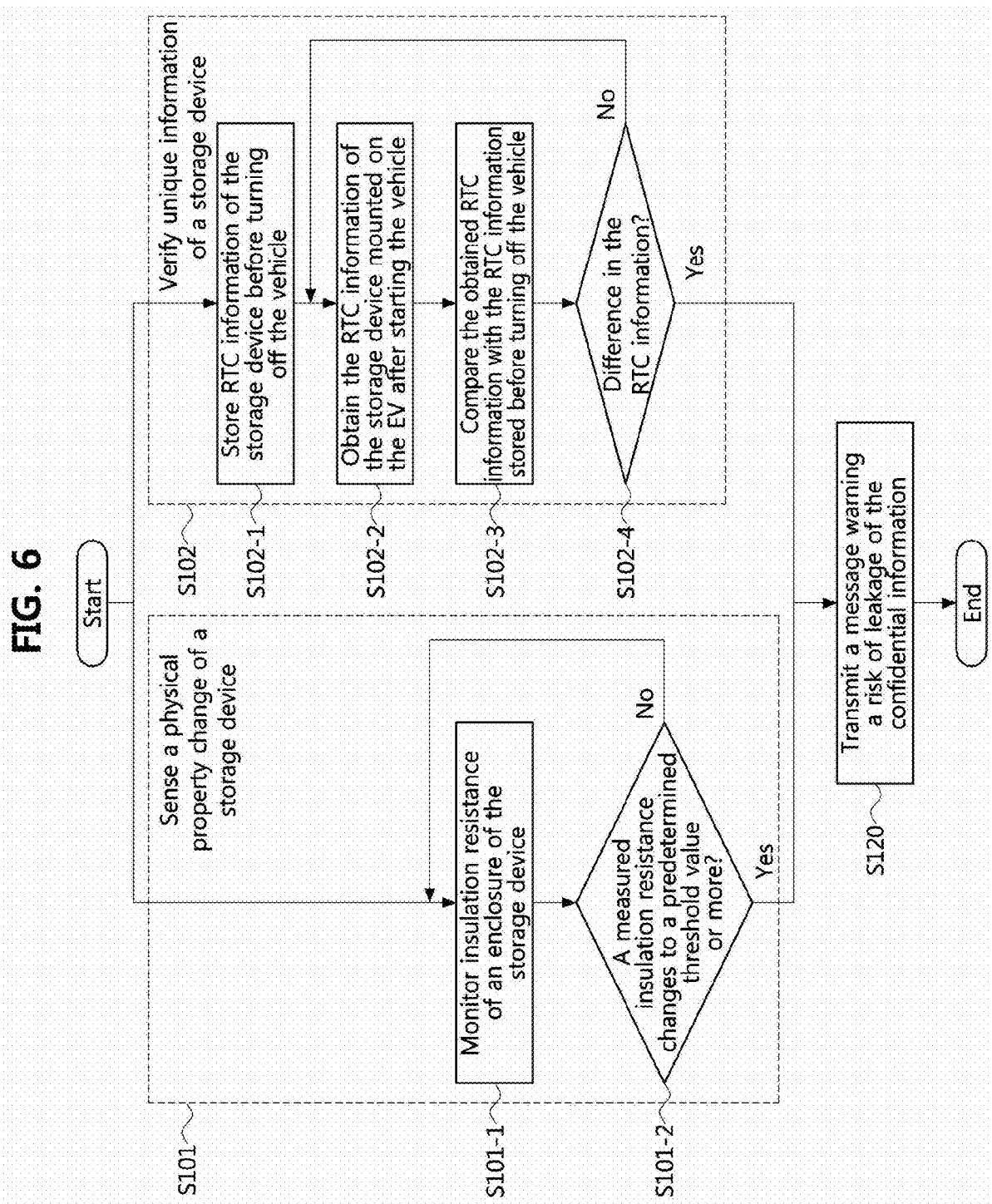
FIG. 6 is a flowchart illustrating a process for determining whether a CCM is abnormal in the flowchart of FIG. 5.

FIG. 5 is a flowchart illustrating a method for protecting confidential information in an EV power transfer system according to an embodiment of the present disclosure, and FIG. 6 is a flowchart illustrating a process for determining whether a CCM is abnormal in the flowchart of FIG. 5.

According to an embodiment of the present disclosure, in order to identify theft and leakage of the CCM described above, proposed is a method of determining whether or not leakage of the confidential information occurs by determining an abnormality of the CCM itself in which the confidential information is stored. Here, although the confidential information is assumed to be stored in the CCM in the foregoing, it may be applied to various devices in the vehicle (e.g., EVCC) in which the confidential information necessary for the power transfer process is stored. Therefore, in the following, the various devices storing such the confidential information will be collectively referred to as a storage device.

As shown in FIG. 5, a method for protecting confidential information in an EV power transfer system may include a step S100 of determining whether there is an abnormality in a storage device in which confidential information for transferring electric power from a charging station to an EV is stored, and a step S120 of transmitting a message warning a risk of leakage of the confidential information when it is determined that there is the abnormality in the storage device. Here, in the step of transmitting, the message may be transmitted to a user terminal of the vehicle, or may be transmitted to an in-vehicle display unit and displayed to the user through the in-vehicle display unit. In addition, the warning message may include a text message composed of a predetermined text, a notification sound, a vibration, or the like.

In addition, when a charging progress message is received from the user terminal in response to the warning message, the power transfer to the EV may be started. On the other hand, when a charging stop message is received from the user terminal in response to the warning message, the power transfer to the EV may be stopped and a message requesting prohibition of use of the payment information for the target EV may be transmitted to a payment server. Here, the payment server may be a server that communicates with the user terminal, the EV, the charging station, and the like, receives the payment information for the power transfer, and transmits payment result information. In embodiments, the user of the vehicle may check the warning message through the user terminal, determine whether to proceed with charging, and transmit the charging progress message or the charging stop message through the user terminal.

As shown in FIG. 6, a flowchart illustrating the step S100 of determining whether or not the storage device is abnormal in the flowchart according to FIG. 5 may be confirmed. For example, the step S100 of determining whether or not the storage device is abnormal may include a step S101 of detecting a change in a physical property of the storage device or a step S102 of verifying unique information of the storage device.

For example, if an intruder opens the enclosure of the storage device, the physical property of the enclosure may change. Accordingly, by sensing the change in the physical property of the enclosure, it may be determined whether or not the storage device is physically intruded. Also, if an intruder steals a storage device of another person and mounts the storage device to his or her vehicle, unique information about the storage device may be changed. Accordingly, by verifying the unique information of the storage device, it may be determined whether or not the storage device is a stolen storage device.

First, the step S101 of detecting a change in physical property of the storage device may include a step S101-1 of monitoring insulation resistance of the enclosure of the storage device and a step S101-2 of determining whether a measured insulation resistance changes as a result of the monitoring to a predetermined threshold value or more.

In the step S101-2, if the insulation resistance does not change above the predetermined threshold value (or there is no abnormal change), it may be re-executed from step S101-1 of monitoring the insulation resistance against the enclosure of the storage device again.

As the method for monitoring the insulation resistance of the enclosure of the storage device, a micro current may be applied to the enclosure of the CCM, and the insulation resistance of the enclosure of the CCM may be measured. Here, when the insulation resistance of the enclosure of the storage device is changed to the predetermined threshold value or more, it may be determined that there is intrusion of an intruder such as detachment of the enclosure of the storage device. Here, the threshold value, a fluctuation width, etc. for determining the abnormal change of the insulation resistance may be determined experimentally based on the measured insulation resistance by measuring the insulation resistance to the enclosure of the CCM.

Although the insulation resistance was explained as a measure for sensing the change in the physical property of the enclosure of the storage device, a mechanical sensor may be attached to the enclosure of the storage device, and the mechanical sensor may be used to detect opening or closing, an external impact, a damage, or the like of the enclosure, as a means of detecting the change in the physical property of the enclosure of the storage device.

Meanwhile, the step S102 of verifying the unique information of the storage device may include a step of verifying real time clock (RTC) information of the storage device. Generally, the CCM (or storage device) may be supplied with a constant power source (e.g., B+ power) even if the vehicle is turned off. The CCM may be in a sleep state through the supplied power source, and the RTC information of the CCM may be maintained without being extinguished. Considering this, the RTC information of the CCM may be maintained if the CCM is not replaced. Therefore, the RTC information may be utilized as the unique information of the storage device in which the confidential information is stored.

Specifically, the step S102 of verifying the unique information of the storage device may include a step S102-1 of storing the RTC information of the storage device before turning off the vehicle, a step S102-2 of obtaining the RTC information of the storage device mounted on the EV after starting the vehicle, and a step S102-3 of comparing the obtained RTC information with the RTC information stored before turning off the vehicle. Here, if it is determined that there is no difference in the RTC information as a result of the determination in the step S102-3 (S102-4), it may be re-performed from the step S102-2 of obtaining the RTC information of the storage device after starting the vehicle. On the other hand, if it is determined that there is a difference in the RTC information as the result of the determination in step S102-3 (S102-4), the step S102 of transmitting a warning message for the confidential information leakage may be performed.

The step S102-2 of obtaining the RTC information of the CCM before turning off the vehicle may include periodically updating the RTC information of the CCM through high-speed controller area network (CAN) communication.

In this case, an apparatus for performing the method for protecting confidential information in the EV power transfer system described in FIGS. 5 and 6 may be embedded in the CCM, or may be embedded in another controller or storage in the EV. Also, the apparatus for performing the method for protecting confidential information may be a separate device (e.g., battery management system (BMS)) that communicates with another controller in the EV.

FIG. 7 is a sequence diagram for explaining an EV power transfer method in which security of confidential information is enhanced through the method according to FIGS. 5 to 6 in an EV power transfer system according to an embodiment of the present disclosure.

As shown in FIG. 7, a transport layer security (TLS) session establishment may be performed between the charging station 20 and an external payment server 40 as a preliminary procedure for power transfer (S200). Also, when the TLS session is established (S200), a procedure for exchanging or updating security information between the charging station 20 and the external payment server 40 may be performed (S205). For example, a certificate of the charging station 20 may be updated from the external payment server 40.

Then, a connection for communication between the EV 10 and the charging station 20 may be established (S210). When the connection is established between the EV 10 and the charging station 20 (S210), before a TLS session between the EV 10 and the charging station 20 is established, it may be determined whether there is an abnormality in the CCM in which the confidential information is stored (S215). Here, the method described in FIGS. 5 and 6 may be applied to the method of determining the abnormality of the CCM.

When it is determined in the step S215 that there is no abnormality in the CCM, the TLS session establishment process S220 between the EV 10 and the charging station 20 may be proceeded, and in the process of establishing the TLS session, the certificate stored in the CCM of the EV 10 may be used. When the TLS session is established (S220), payment information may be exchanged between the EV 10 and the charging station 20 (S225). Here, the charging station 20 may optionally transmit the payment information received from the EV 10 to the payment server 40, and may receive billing information corresponding to identification information of the corresponding EV (or, an owner of the EV) from the payment server 40.

When the payment information exchange between the EV 10 and the charging station 20 is completed, a mutual authentication procedure may be performed through exchange of authentication information (S240). When the mutual authentication is completed, a charging status exchange process and a charging receipt (i.e., 'MeteringReceipt') exchange process may be performed between the EV 10 and the charging station 20. When the charging is completed, a TLS session termination (S250) and a connection termination (S255) between the EV 10 and the charging station 20 may proceed.

On the other hand, when it is determined in the step S215 that there is an abnormality in the CCM, a further power transfer process may be stopped, the warning message may be transmitted to the user terminal or the charging station 20, and the display unit mounted in the EV 10 may also display the warning message.

FIG. 8 is a diagram illustrating a first example to which a confidential information protection method is applied in an EV power transfer system according to an embodiment of the present disclosure, and FIG. 9 is a diagram illustrating a second example to which a confidential information protection method is applied in an EV power transfer system according to an embodiment of the present disclosure.

As shown in FIG. 8, the confidential information protection method described with reference to FIGS. 5 to 6 may be used for diagnostic purposes to check whether or not the CCM of the EV is abnormal.

For example, communication for power transfer between the EV 10 and the charging station 20, as well as communication for diagnosis of the CCM mounted on the EV 10, may be performed through PLC communication. In this case, diagnostic information acquired by the charging station 20 from the EV 10 may be analyzed through a connected car service platform (CCSP) 50 to generate status information about the EV, and the generated status information may be transmitted to the user terminal 60 together with the existing charging information. Such the communication for diagnosis may complement the user's experience of vehicle maintenance.

As shown in FOG. 9, an EV power transfer system, in which an operation server 44 for operating the power network, a charger server 40 for operating the charging station, an OEM server 42 for user authentication, the user terminal 60, the EV 10, the charging station 20, and the like interoperate with each other through wireless communications, may be identified. In the configuration according to FIG. 9, information of the charging station may be updated through wireless communication, the charging status information may be provided to each entity in the system, and the billing and authentication may be performed in conjunction with each other. In FIG. 9, mutual data transmission and reception may be performed through TLS-based secure communication.

The confidential information protection method described with reference to FIGS. 5 to 6 may be applied not only to an EV, but also to communication modules of various entities involved in the electric power transfer process, as shown in FIG. 9.

For example, the method may be applied to a communication module (or EVCC 70) of the EV 10 or a communication module (or SECC 80) of the charging station 20, and may be applied to a communication module 90 of the operation server 44 for operating the power network.

Figure 10:
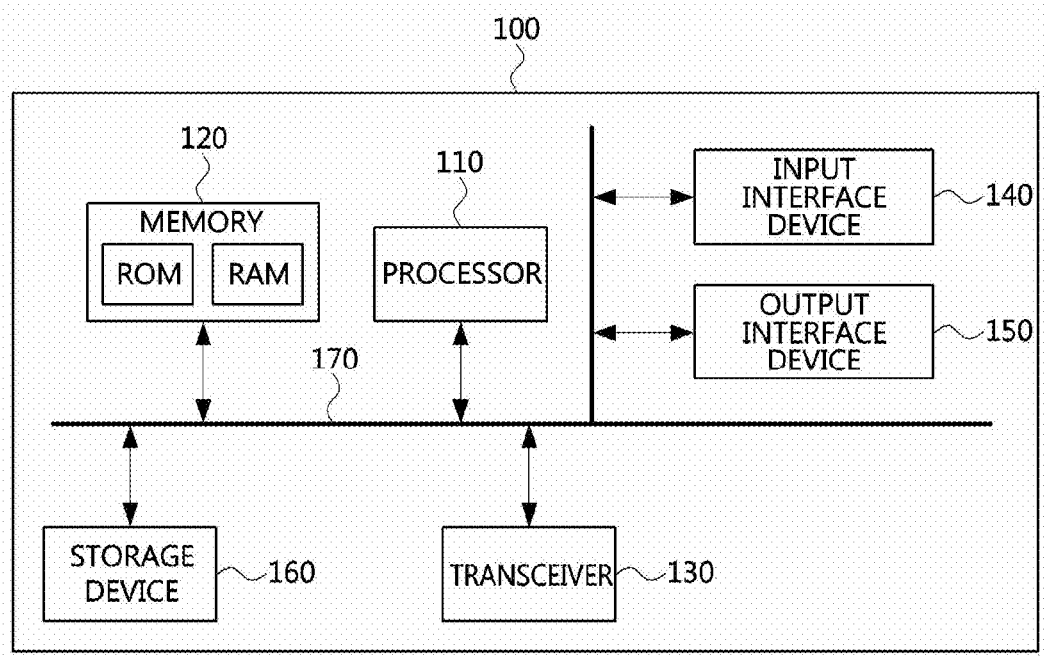
FIG. 10 is a block diagram illustrating a confidential information protection apparatus mounted on an EV in an EV power transfer system according to an embodiment of the present disclosure.

FIG. 10 is a block diagram illustrating a confidential information protection apparatus mounted on an EV in an EV power transfer system according to an embodiment of the present disclosure.

As shown in FIG. 10, in an EV power transfer system, a confidential information protection apparatus 100 of an EV may include at least one processor 110 and a memory 120 that stores instructions that direct or cause the one or more processors 110 to perform a method including at least one step.

The at least one step may comprise a step of determining whether there is an abnormality in a storage device in which confidential information for transferring electric power from a charging station to an EV is stored, and a step of transmitting a message warning a risk of leakage of the confidential information when it is determined that there is the abnormality in the storage device.

The step of determining whether there is an abnormality in the storage device may include a step of sensing a physical property change of the storage device or verifying unique information of the storage device.

The confidential information may include at least one of information on the EV, user information, authentication information, payment information, an encryption key and a certificate for mutual authentication and payment between the EV and the charging station, and the like.

In the step of determining whether there is an abnormality in the storage device, a physical property change due to removal or damage of the enclosure of the storage device may be sensed.

The step of determining whether there is an abnormality in the storage device may include a step of determining whether the storage device is abnormal through an insulation resistance of the enclosure of the storage device.

The step of determining whether there is an abnormality in the storage device may include a step of monitoring insulation resistance of the enclosure of the storage device and a step of determining whether a measured insulation resistance changes as a result of the monitoring to a predetermined threshold value or more.

The step of determining whether there is an abnormality in the storage device may include a step of verifying RTC information of the storage device.

The step of verifying RTC information of the storage device may include a step of storing the RTC information of the storage device before turning off the vehicle, a step of obtaining the RTC information of the storage device mounted on the EV after starting the vehicle, and a step of comparing the obtained RTC information with the RTC information stored before turning off the vehicle.

The storage device may be an EVCC embedded in the EV.

Meanwhile, according to an embodiment of the present disclosure, an EV for protecting the storage device storing confidential information from external intrusion may be provided.

In the EV power transfer system, the EV for protecting the storage device storing confidential information from external intrusion may include at least one processor, a battery receiving and storing power from a charging station, an EVCC transmitting and receiving data for power transfer by wirelessly communicating with the charging station, the storage device storing confidential information for the power transfer, and a memory that stores instructions that direct the at least one processor to perform at least one step.

The at least one step may comprise a step of determining whether there is an abnormality in a storage device in which confidential information for transferring electric power from a charging station to an EV is stored, and a step of transmitting a message warning a risk of leakage of the confidential information when it is determined that there is the abnormality in the storage device.

The step of determining whether there is an abnormality in the storage device may include a step of sensing a physical property change of the storage device or verifying unique information of the storage device.

The confidential information may include at least one of information on the EV, user information, authentication information, payment information, an encryption key and a certificate for mutual authentication and payment between the EV and the charging station, and the like.

The storage device may be implemented as an integrated module with the EVCC.

The step of determining whether there is an abnormality in the storage device may include a step of determining whether the storage device is abnormal through an insulation resistance of the enclosure of the storage device.

In addition, the method described in FIGS. 5 to 6 may be performed in the EV for protecting the storage device storing confidential information from external intrusion.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for an embodiment of the present disclosure.

Examples of the computer readable medium may include a hardware device including ROM, RAM, and flash memory, which are configured to store and execute the program instructions. Examples of the program instructions include machine codes made by, for example, a compiler, as well as high-level language codes executable by a computer, using an interpreter. The above hardware device can be configured to operate as at least one software module to perform the operation of the present disclosure, and vice versa. Also, the above-described method or apparatus may be implemented by combining all or a part of the structure or functions, or may be implemented separately.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Furthermore, the above-mentioned method or apparatus may be implemented by combining all or a part of the configuration or function, or may be implemented separately.

While the embodiments of the present disclosure and their advantages have been described in detail, it should be understood that various changes, substitutions, and alterations may be made herein without departing from the scope of the present disclosure.

What is claimed is:

1. A method of protecting confidential information stored in an electric vehicle (EV) and used in an EV power transfer system, the method comprising:
    determining whether there is an abnormality in a storage device in which confidential information for transferring electric power from a charging station to the EV is stored; and
    transmitting a message warning a risk of leakage of the confidential information when it is determined that there is the abnormality in the storage device,
    wherein the determining whether there is an abnormality in the storage device includes sensing a physical property change of the storage device or verifying unique information of the storage device, and verifying real time clock (RTC) information of the storage device,
    wherein verifying the RTC information further includes:
    storing the RTC information of the storage device before turning off the EV;
    obtaining the RTC information of the storage device mounted on the EV after starting the EV; and
    comparing the obtained RTC information with the RTC information stored before turning off the EV.

2. The method according to claim 1, wherein the confidential information includes at least one of information on the EV, user information, authentication information, payment information, an encryption key and a certificate for mutual authentication and payment between
    the EV and the charging station.

3. The method according to claim 1, wherein, in the determining whether there is an abnormality in the storage device, a change in a physical property of an enclosure of the storage device due to removal or damage of the enclosure of the storage device is sensed.

4. The method according to claim 1, wherein the physical property includes an insulation resistance of an enclosure of the storage device.

5. The method according to claim 4, wherein the determining whether there is an abnormality in the storage device further includes:
    monitoring an insulation resistance of the enclosure of the storage device; and
    determining whether a measured insulation resistance changes to a predetermined threshold value or more.

6. The method according to claim 1, wherein the storage device is an electric vehicle communication controller (EVCC) embedded in the EV.

7. An apparatus for protecting confidential information, which is mounted on an electric vehicle (EV), the confidential information being used in an EV power transfer system, the
    apparatus comprising at least one processor and a memory storing instructions that direct the at least one processor to perform a method which comprises:
    determining whether there is an abnormality in a storage device in which confidential information for transferring electric power from a charging station to the EV is stored; and
    transmitting a message warning a risk of leakage of the confidential information when it is determined that there is the abnormality in the storage device,
    wherein the determining whether there is an abnormality in the storage device includes sensing a physical property change of the storage device or verifying unique information of the storage device, and verifying real time clock (RTC) information of the storage device, and
    wherein verifying the RTC information further includes:
    storing the RTC information of the storage device before turning off the EV;
    obtaining the RTC information of the storage device mounted on the EV after starting the EV; and
    comparing the obtained RTC information with the RTC information stored before turning off the EV.

8. The apparatus according to claim 7, wherein the confidential information includes at least one of information on the EV, user information, authentication information, payment information, an encryption key and a certificate for mutual authentication and payment between the EV and the charging station.

9. The apparatus according to claim 7, wherein, in the determining whether there is an abnormality in the storage device, a change in a physical property of an enclosure of the storage device due to removal or damage of the enclosure of the storage device is sensed.

10. The apparatus according to claim 7, wherein the determining whether there is an abnormality of the storage device includes determining whether the storage device is abnormal through an insulation resistance of an enclosure of the storage device.

11. The apparatus according to claim 10, wherein the determining whether there is an abnormality in the storage device further includes:
    monitoring insulation resistance of the enclosure of the storage device; and
    determining whether a measured insulation resistance changes to a predetermined threshold value or more.

12. The apparatus according to claim 7, wherein the storage device is an electric vehicle communication controller (EVCC) embedded in the EV.

13. An electric vehicle (EV) comprising:
    at least one processor;
    a battery configured to receive power from a charging station and storing the power; an electric vehicle communication controller (EVCC) configured to transmit and receive data for power transfer by wirelessly communication with the charging station;
    a storage device configured to store the confidential information for use in payment for the power transfer; and
    a memory storing instructions that direct the at least one processor to perform a method which comprises:

determining whether there is an abnormality in a storage device in which confidential information for transferring electric power from a charging station to the EV is stored; and transmitting a message warning a risk of leakage of the confidential information when it is determined that there is the abnormality in the storage device, wherein the determining whether there is an abnormality in the storage device includes sensing a physical property change of the storage device or verifying unique information of the storage device, and verifying real time clock (RTC) information of the storage device, and wherein verifying the RTC information further includes:

storing the RTC information of the storage device before turning off the EV;

obtaining the RTC information of the storage device mounted on the EV after starting the EV; and comparing the obtained RTC information with the RTC information stored before turning off the EV.

14. The EV according to claim 13, wherein the confidential information includes at least one of information on the EV, user information, authentication information, payment information, an encryption key and a certificate for mutual authentication and payment between the EV and the charging station.

15. The EV according to claim 13, wherein the storage device is implemented as an integrated module with the EVCC.

16. The EV according to claim 13, wherein the determining whether there is an abnormality of the storage device includes determining whether the storage device is abnormal through an insulation resistance of an enclosure of the storage device.

* * * * *